United States Patent [19]

Janssen

[11] 4,354,145

[45] Oct. 12, 1982

[54] ELECTRONICALLY COMMUTATING MOTOR

[75] Inventor: Johannes H. H. Janssen, Eindhoven, Netherlands

[73] Assignee: U.S. Philips Corporation, New York, N.Y.

[21] Appl. No.: 207,541

[22] Filed: Nov. 17, 1980

[30] Foreign Application Priority Data

Dec. 12, 1979 [NL] Netherlands ......................... 7908926

[51] Int. Cl.³ ........................................... H02K 29/02
[52] U.S. Cl. ..................................... 318/254; 318/138
[58] Field of Search ..................... 318/254 A, 254, 138

[56] References Cited

U.S. PATENT DOCUMENTS

4,135,120  1/1979  Hoshimi et al. ................. 318/254 A

Primary Examiner—B. Dobeck
Assistant Examiner—S. M. Bergmann
Attorney, Agent, or Firm—Robert T. Mayer; Bernard Franzblau

[57] ABSTRACT

An electric machine with electronic commutation includes two Hall elements arranged at an angular spacing about the rotor axis smaller than the phase difference $\phi$ required between the energizing signals in order to obtain a correct energization of the motor. The energizing circuit for the stator coils is provided with a combining circuit for linearly combining the signals obtained from the Hall elements in order to obtain signals with a phase difference equal to $\phi$.

11 Claims, 15 Drawing Figures

ELECTRONICALLY COMMUTATING MOTOR

The invention relates to an electric machine with electronic commutation having a rotor which at least partly consists of a permanent-magnet material, which rotor cooperates with at least two stationarily arranged stator coils. The machine is equipped with at least two magneto-sensitive elements arranged on a common substrate, specifically Hall elements, for supplying signals which vary substantially sinusoidally as a function of the rotor position in order to energize the stator coils as a function of the rotor position via an energizing circuit, the magneto-sensitive elements being arranged of angular spacings around the rotor axis which are smaller than the phase difference $\phi$ which is necessary between the energizing signals for the stator coils in order to obtain a correct energization of said stator coils.

Such a machine is known from U.S. Pat. No. 4,074,173.

In conventional electronically commutating machines the magneto-sensitive elements are arranged at an angle $\phi$ corresponding to the phase angle of the machine, i.e. electrically at 120° in the case of a three-phase machine and at 90° in the case of a two or four-phase machine. In accordance with the said Patent the drawbacks, such as mounting and interconnecting two separate parts, are overcome by mounting the two magneto-sensitive elements together on one substrate and having them co-operate with a disk which is mounted on the rotor shaft and is provided with two concentric magnetically coded tracks. A disadvantage of this is that, since said tracks should be arranged near each other, there is a substantial amount of leakage so that the Hall elements receive little flux and should be mounted very close to the disk, but so as to ensure a free rotation of the disk. Moreover, such a magnetically-coded disk is highly disadvantageous from an economic point of view.

It is an object of the invention to provide an electric machine which does not have this drawback and to this end it is characterized in that the energizing circuit is provided with a combining circuit for linearly combining the signals supplied by at least two magneto-sensitive elements in order to obtain at least two energizing signals having a mutual phase difference which is substantially equal to $\phi$.

The invention is based on the recognition that from two phase-shifted substantially sinusoidal signals two signals with another phase difference can be derived by linearly combining said signals and that this enables the magneto-sensitive elements to be arranged at relatively small angular spacings around the rotor axis.

A first preferred embodiment of the invention concerns a two-phase or four-phase machine and is characterized in that the combining circuit supplies a signal which is proportional to the sum of the signals supplied by the two magneto-sensitive elements and a signal which is proportional to the difference of the signals supplied by the two magneto-sensitive elements.

This embodiment has the advantage that the phase difference between said combined signals is independent of the angular spacings between the magneto-sensitive elements.

In general, such a linear combinations, which also enables phase differences other than 90° to be realized, may be characterized in that the combining circuit supplies a first signal C, which satisfies the equation $C = A + KB$, and a second signal D, which satisfies the equation $D = A - KB$, where A is the signal supplied by a first one of the magneto-sensitive elements, B is the signal supplied by a second one of the magneto-sensitive elements, and K is a predetermined constant such that the phase difference between the signals C and D is equal to $\phi$.

A drawback of this combining method may be that in general the amplitudes of the combination signals C and D are not equal. An embodiment of the machine in accordance with the invention which does not have said drawback may be characterized in that the combining circuit supplies a first signal C, which satisfies the equation $C = A - kB$, and a second signal D, which satisfies the equation $D = B - kA$, where A is the signal supplied by a first one of the magneto-sensitive elements, B is the signal supplied by a second one of the magneto-sensitive elements, and k is a predetermined constant such that the phase difference between the signals C and D is equal to $\phi$.

A very simple embodiment of the last-mentioned machine may further be characterized in that the energizing circuit comprises a first comparator, of which a first input is connected to a first one of the magneto-sensitive elements, of which an output is connected to the series connection of a first one of the stator coils and a first resistor, and of which a second input is connected to the junction between said first stator coil and said first resistor, a second comparator, of which a first input is connected to a second one of the magneto-sensitive elements, of which an output is connected to the series connection of a second one of the stator coils and a second resistor, and of which a second input is connected to the junction between the second stator coil and said second resistor, and a third resistor which is included between the junction of the first stator coil and the first resistor and the junction of the second stator coil and the second resistor.

A preferred embodiment of a three-phase machine in accordance with the invention may further be characterized in that the first resistor is a variable resistor.

The invention will now be described in more detail with reference to the drawing, in which.

Figure 1:
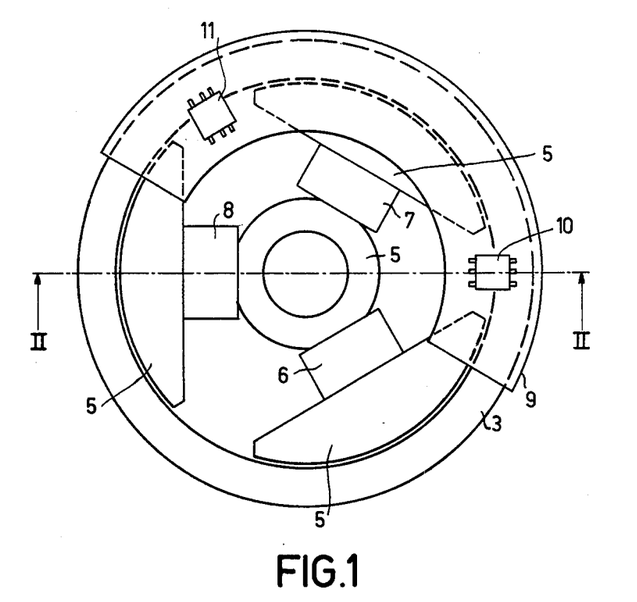
FIG. 1 is a schematic view of a three-phase electronically commutating motor which is equipped with a Hall-element in a conventional manner.
Figure 2:
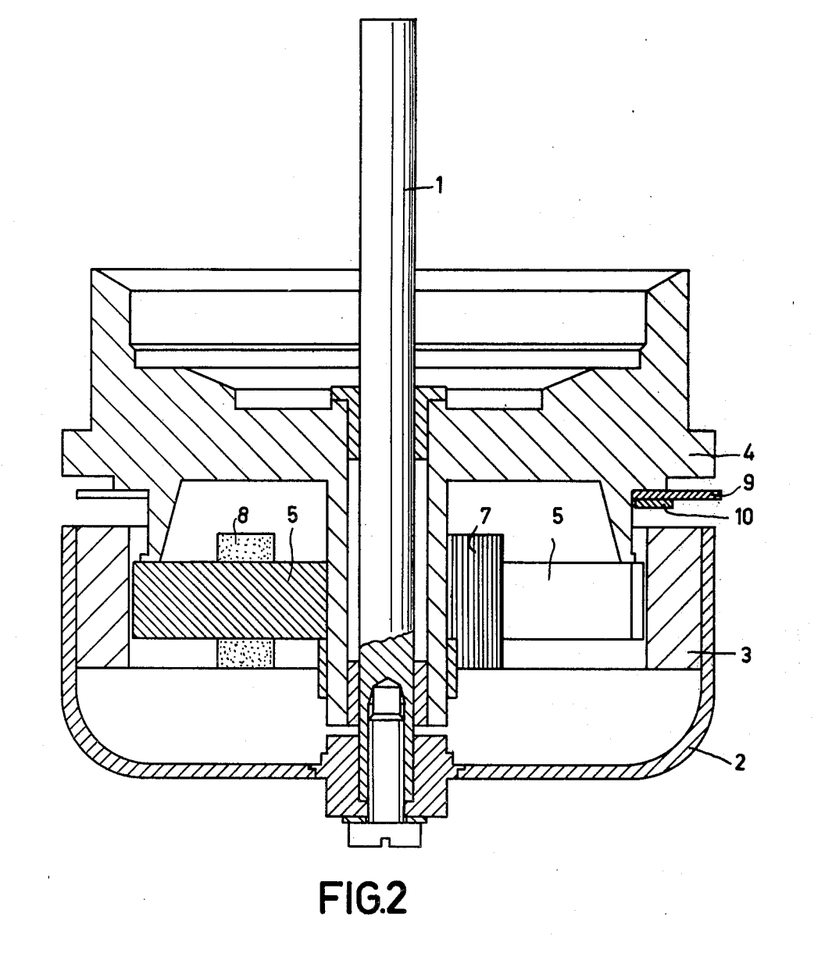
FIG. 2 represents a sectional view of the motor of FIG. 1 in more detail.

FIG. 1 is a schematic view of a three-phase electronically commutating motor which is equipped with Hall elements in a conventional manner and FIG. 2 in a greater detail represents a sectional view of the motor of FIG. 1 taken on the line II—II. The motor comprises a shaft 1 on which a bell-shaped rotor housing 2 is secured, which on the inner circumference is provided with an annular permanent magnet 3. The stator body 4 carries a lamination assembly 5 on which three stator coils 6, 7 and 8 are arranged. On the stator body 4 a support 9 is mounted on which the Hall elements 10 and 11 are arranged at an angle of 120°, which elements detect the field of the permanent-magnet ring 3 and, via a circuit which is also mounted on said support, energize the stator coils 6, 7 and 8 as a function of the rotor position.

Figure 3:
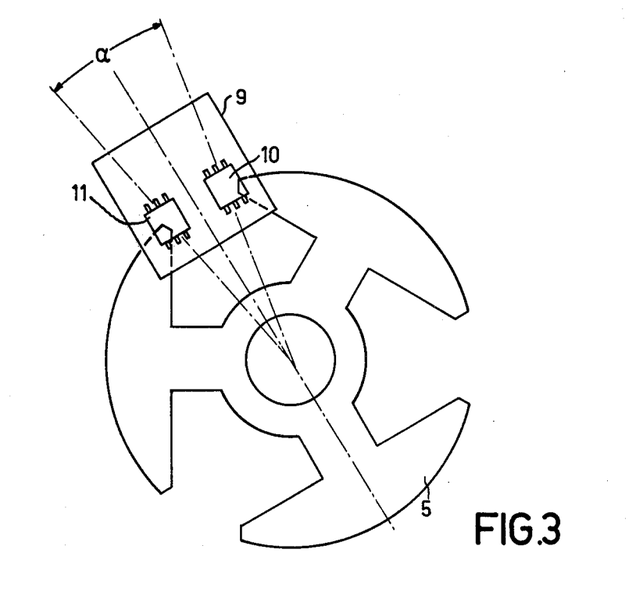
FIG. 3 shows the arrangement of the Hall elements in accordance with the invention in a motor as shown in FIG. 1.

FIG. 3 illustrates a solution for the arrangement of the Hall elements 10 and 11 in accordance with the invention in a motor in accordance with FIGS. 1 and 2. For the sake of simplicity only the stator lamination assembly of this motor is shown. The two Hall elements 10 and 11 are arranged close to each other—at an angular spacing $\alpha$—so that by means of film techniques they can be accommodated on one substrate together with the required electronics or they can even be incorporated in one integrated circuit together with the required electronics. Nevertheless it is possible to realize the correct phase differences between the energizing signals for the stator coils by generating linear combinations of the signals from the Hall elements 10 and 11, provided that said signals are substantially sinusoidal.

Figure 4:
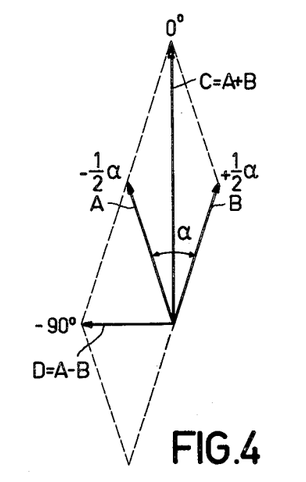
FIG. 4 is a vector diagram to illustrate the use of the invention in a two-phase motor.

This is illustrated in FIG. 4 by means of a vector diagram for a two-phase (or four-phase) motor. The signals A and B from the Hall elements 10 and 11 respectively, the sum C of these signals A and B and the difference D of said signals A and B are represented as vectors in this Figure. It is found that generating the linear combinations:

$$C = A + B$$

and $$D = A - B$$

yields two signals with a phase difference of 90°. For these combinations, this is independent of the angle $\alpha$ between the Hall elements. In general it is possible to generate any phase difference between the signals C and D by means of the linear combinations:

$$C = A + KB$$

and $$D = A - KB$$

where K is a constant factor which depends on the angle $\alpha$ and the desired phase difference between the signals C and D. If it is required—for example when the two Hall elements 10 and 11 are disposed symmetrically relative to the centre between two stator poles, as is shown in FIG. 3—that the vector C be situated exactly between the vectors A and B in view of the correct commutation instants, then it is for example possible to generate the following linear combinations:

$$C = A + B$$

$$D = A - KB$$

Figure 5:
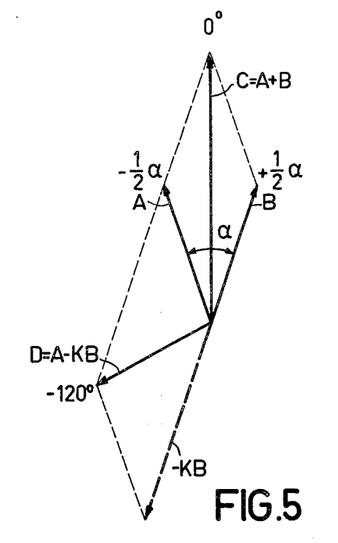
FIG. 5 is a vector diagram to illustrate a first general embodiment of a motor in accordance with the invention.

FIG. 5 shows such a vector diagram for a phase difference of 120° between the signals C and D. This diagram is self-explanatory.

In the case of the combination methods described with reference to the vector diagrams of FIGS. 4 and 5 the amplitudes of the signals C and D are not equal when the amplitudes of the signals A and B are equal. When the signals C and D solely switch the stator excitation at their zero passages, this is not a problem. However, if the signals C and D are employed as energizing signals for the stator coils, as the case may be after amplification, then it may be necessary to amplify the two signals to the same amplitude by adapting the gain factors of said amplifier. A combination method which does not have this drawback is described with reference to FIG. 6.

Figure 6:
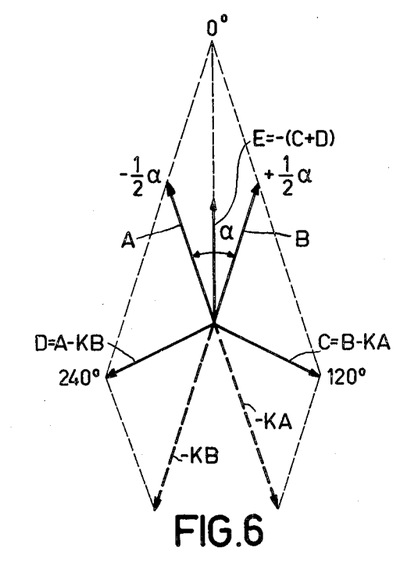
FIG. 6 is a vector diagram to illustrate a preferred embodiment of a motor in accordance with the invention.

FIG. 6 represents the vector diagram associated with the following linear combinations:

$$C = B - KA$$

$$D = A - KB$$

In the case of this linear combination the amplitudes of the signals C and D are equal if the amplitudes of the signals A and B are also equal. In the vector diagram of FIG. 6 the factor K has been selected so that when the vectors A and B are situated at $-\frac{1}{2}\alpha$ and $+\frac{1}{2}\alpha$ respectively, the vectors C and D are situated at $+120°$ and $+240°$ respectively. The third phase-signal E for a three-phase motor is obtained in known manner by inverting the sum of the signals C and D ($E = -C - D$). It is also possible to employ the attenuated sum of the signals A and B.

Figure 7:
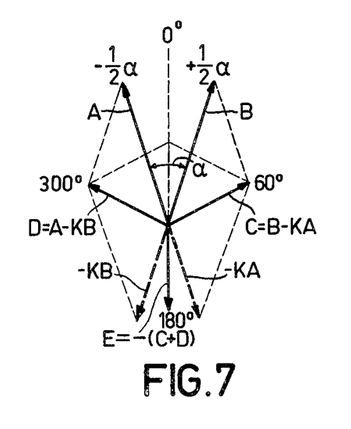
FIG. 7 is a vector diagram to illustrate an alternative of the embodiment described with reference to FIG. 6.

FIG. 7 represents the vector diagram of an alternative method of realizing the combination described with reference to FIG. 6 in order to obtain a three-phase signal. The factor K is then selected so that the vectors C and D are situated at 60° and 300° respectively and the vector $E = -(C+D)$ is consequently situated at $-180°$.

The linear combinations described can simply be realized by means of operational amplifiers, which may be integrated together with the Hall elements 10 and 11.

Figure 8:
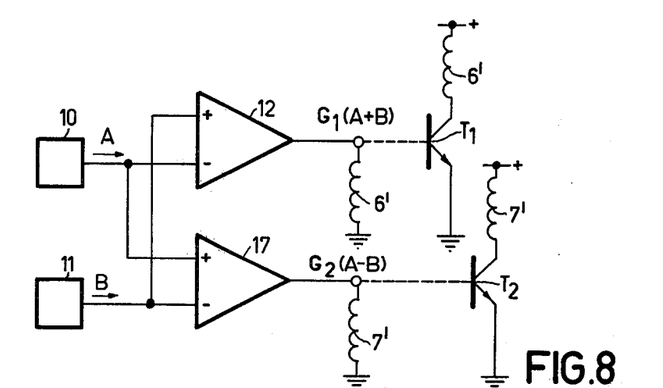
FIG. 8 is a circuit for realizing the linear combination described with reference to FIG. 4.

FIG. 8 shows an example of a circuit for realizing the linear combination described with reference to FIG. 4. The circuit comprises a summing amplifier 12 having a gain factor $G_1$, to which the signals A and B from the Hall elements 10 and 11 are applied. The output signal $G_1(A+B)$ may be applied directly across a stator coil 6' of a two-phase motor. The signals A and B are furthermore applied to a differential amplifier 17 with a gain factor $G_2$. The output signal $G_2(A-B)$ is then 90° out of phase with the output signal $G_1(A+B)$ and may be applied directly to the other stator coil 7'. By a suitable adjustment of the gain factors $G_1$ and $G_2$ relative to each other the amplitudes of the two output signals can be equalized.

The amplitude ratio of the signals $G_1(A+B)$ and $G_2(A-B)$ is of less significance when these signals are employed as switching signals, for example when the outputs of the amplifiers 12 and 17 are connected to the stator coils 6' and 7' via switching transistors $T_1$ and $T_2$ respectively instead of directly, as is represented by the dashed connections in FIG. 8.

By means of the circuit of FIG. 8 it is also possible to realize other linear combinations of the signals A and B in order to realize phase differences other than 90° between the output signals, employing the linear combinations discussed with reference to FIGS. 4 and 5. For this purpose the factors K may for example be realized in the amplifiers 12 and 17 for example by means of operational amplifiers known from analogue computing technology.

Figure 9:
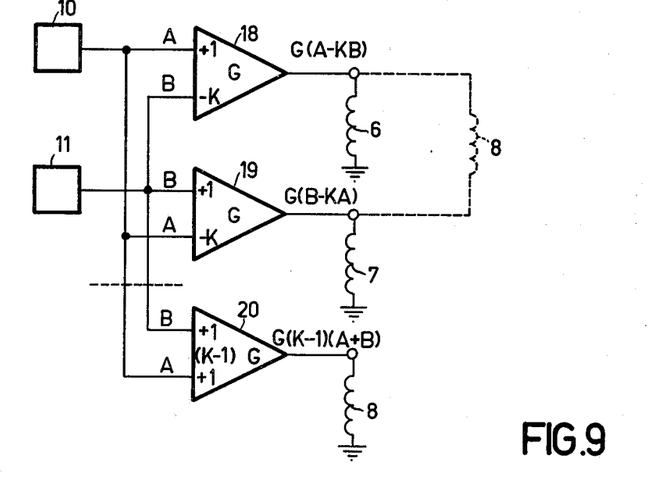
FIG. 9 represents a circuit for realizing the linear combination described with reference to FIGS. 6 and 7.

FIG. 9 shows an example of a circuit for realizing the linear combinations A−KB and B−KA discussed with reference to FIGS. 6 and 7. It comprises an operational amplifier 18, which amplifies the signal A by a factor G and the signal B by a factor −KG, so that an output signal G(A−KB) is obtained which may be applied directly to a stator coil 6 of a three-phase motor. A second operational amplifier 19 amplifies the signal B by a factor G and the signal A by a factor −KG, so that a signal G(B−KA)—which in the case of a suitable choice of the factor K differs 120° in phase with the signal G(A−KB)—is obtained, which may be applied directly to the coil 7 of the three-phase motor. The third phase can be obtained by inverting the sum of the output signals, which yields the signal G(k−1)(A+B). This signal—as is shown in FIG. 9—can also be realized by means of a third amplifier 20 having a gain factor (k−1)G, to which the signals A and B are applied. The output signal may then be applied directly to the third stator coil 8.

Figure 10:
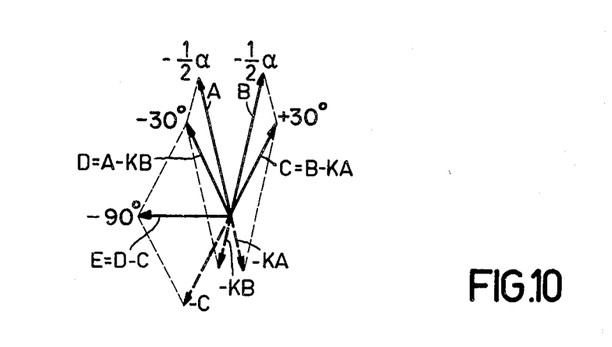
FIG. 10 is a vector diagram to illustrate the linear combination in the case of a three phase motor.

As is known, a three-phase motor may also be energized by three signals having a phase difference of 60° relative to each other instead of by three signals having a phase difference of 120° relative to each other, if one of the stator coils is energized with opposite polarity or, viewed from the winding sense, from the opposite direction. This means that in the diagram of FIG. 7, for example, the vector E is shifted through 180° so that the vectors C, D and E are situated at 60° relative to each other. If, as is illustrated by the vector diagram of FIG. 10, two signals C and D with a phase difference of 60° are generated by a suitable choice of the factor K, the third phase E is obtained by taking the difference E=D−C of the signals D and C. If in the circuit of FIG. 9 the factor K is selected so that a phase difference of 60° exists between the output signals of amplifiers 18 and 19, the third stator coil 8 may be energized with the third phase E by including it between the outputs of the amplifiers 18 and 19, as is represented by the dashed line in FIG. 9. Amplifier 20 may then be dispensed with. Stator coil 7 should then be energized (or wound) in a reverse sense in comparison with the situation with the signals at 120°.

Figure 11:
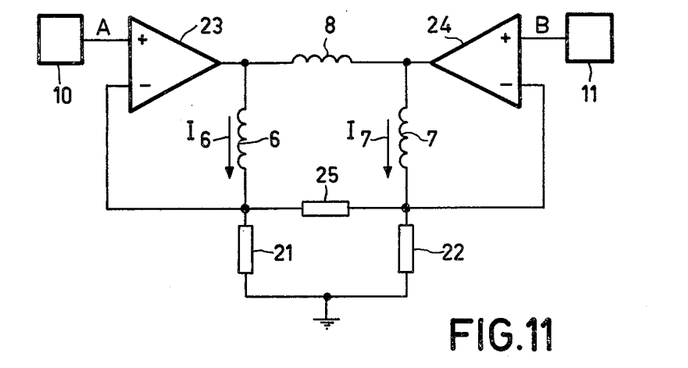
FIG. 11 represents a preferred embodiment for realizing the combination method described with reference to FIG. 10.

The linear combinations C=B−KA and D=A−KB can simply be realized by allowing cross-talk with a factor K to occur between an amplifier for the signal A and an amplifier for the signal B. This is utilized in the circuit of FIG. 11. In this circuit the current through the stator coil 6 or 7 is sensed by including a resistor 21 and 22 respectively, both for example having a resistance value Ro. The current through the stator coil 6 or 7 is controlled by an amplifier 23 and 24 respectively, which compares the signals A and B, in this case a voltage, with the voltage across the resistors 21 and 22 respectively. The currents through the coils 6 and 7 are then A/Ro and B/Ro respectively, which, when the Hall elements 10 and 11 are arranged in a conventional manner (FIG. 1), exhibit a phase difference of for example 120°. If a phase difference of 60° is selected, the third stator coil 8 may simply be inclined between the outputs of the amplifiers 23 and 24. However, if the Hall elements 10 and 11 are arranged at a smaller angle α (FIG. 3), the phase difference between the currents through the coils 6 and 7 can still be made 60° (or, if desired, 120° or other phase differences) by combining the signals A and B, in the present case very simply by including a cross-talk resistor 25 with a resistance value $R_1$ between the junction of the coil 6 and resistor 21 and the junction of coil 7 and resistor 22. Through resistor 21 a current A/Ro flows, through resistor 22 a current B/Ro, and through resistor 25 a current $(A-B)/R_1$, so that through stator coil 6 a current $I_6 = P(A-KB)$ flows and through stator coil 7 a current $I_7 = P(B-KA)$, where $P = (Ro+R1)/RoR1$ and $K = Ro/(Ro+R1)$. By a suitable choice of K, which can be determined by experiment, for example by using a variable resistor for the resistor 25, it is again possible to obtain the correct phase difference.

Figure 12:
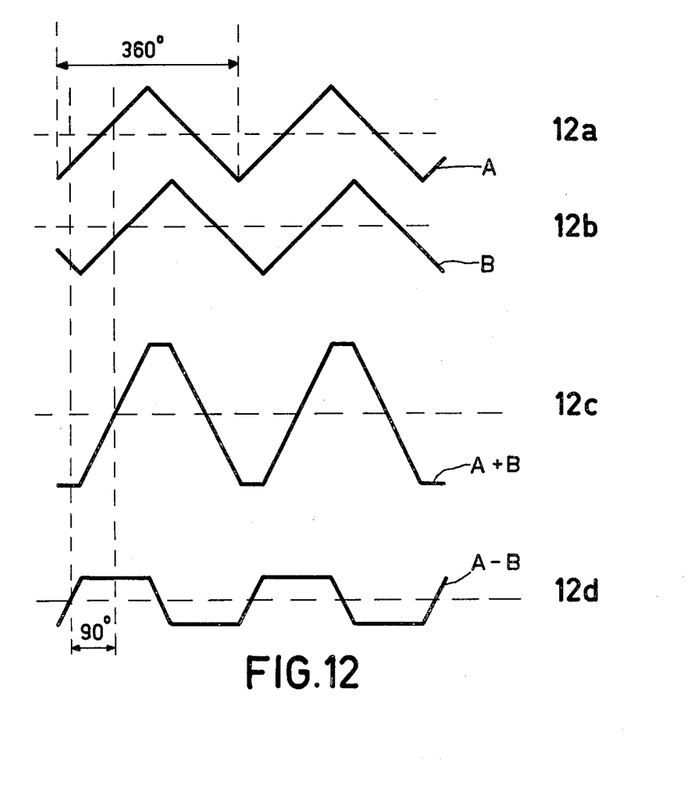
FIG. 12a–12d represents a combination method in accordance with the invention with triangular signals.

In particular when the signals from the Hall elements are used for switching, instead of for analogue energization (as is for example shown as an alternative in FIG. 8), the waveform of the signals A and B generated by the Hall elements 10 and 11 is less critical. This can be demonstrated by means of FIG. 12, in which FIGS. 12a and 12b represent the signals A and B as triangular voltage waveforms. FIG. 12c represents the sum of said signals A and B and FIG. 12d the difference of said signals A and B. It is found that also in this case the zero passages of the combinations A+B and A−B are shifted through a quarter of the period of the signals A and B, i.e. through 90°, relative to each other. Other shifts are possible with other combinations.

Especially when the signals from the Hall elements 10 and 11 and the linear combinations thereof are employed as analogue energizing signals for the stator coils, it may occur in practice that the form and/or the strength of the magnetization of the permanent-magnet rotor is not useful to produce suitable signals in the Hall elements. A suitable solution is then to arrange an additional magnetic disk on the rotor shaft, with which disk the Hall elements cooperate. The advantage that the two elements can be arranged near each other is then maintained, whereas the drawback of the known motor with magnetically-coded disk mentioned in the introduction does not occur.

What is claimed is:

1. An electric machine having electronic commutation comprising, a rotor which at least partly comprises a permanent magnetic material, which rotor co-operates with at least two stationarily arranged stator coils, at least two magneto-sensitive Hall elements arranged on a common substrate for supplying signals which vary substantially sinusoidally with the rotor position in order to energize the stator coils as a function of the rotor position via an energizing circuit, the magneto-sensitive elements being arranged at angular spacings around the rotor axis which are smaller than the phase difference φ which is necessary between the energizing signals for the stator coils in order to obtain a correct energization of said stator coils, and the energizing circuit includes a combining circuit for linearly combining the signals supplied by the at least two magneto-sensitive elements so as to obtain at least two energizing signals having a mutual phase difference which is substantially equal to $\phi$.

2. An electric machine as claimed in claim 1, adapted as a two-phase or a four-phase machine, characterized in that the combining circuit supplies a signal which is proportional to the sum of the signals supplied by the two magneto-sensitive elements and a signal which is proportional to the difference of the signals supplied by the two magneto-sensitive elements.

3. An electric machine as claimed in claim 1, wherein the combining circuit supplies a first signal C, which satisfies the equation $C = A + KB$, and a second signal D, which satisfies the equation $D = A - KB$, where A is the signal supplied by a first one of the magneto-sensitive elements, B is the signal supplied by a second one of the magneto-sensitive elements, and K is a predetermined constant such that the phase difference between the signals C and D is equal to $\phi$.

4. An electric machine as claimed in claim 1, wherein the combining circuit supplies a first signal C, which satisfies the equation $C = A - KB$ and a second signal D, which satisfies the equation $D = B - KA$, where A is the signal supplied by a first one of the magneto-sensitive elements, B is the signal supplied by a second one of the magneto-sensitive elements, and K is a predetermined constant such that the phase difference between the signals C and D is equal to $\phi$.

5. An electric machine as claimed in claim 4, wherein the energizing circuit comprises a first comparator having a first input connected to a first one of the magneto-sensitive elements and and output connected to the series connection of a first one of the stator coils and a first resistor, means connecting a second input of the first comparator to a junction between said first stator coil and said first resistor, a second comparator having a first input connected to a second one of the magneto-sensitive elements and an output connected to the series connection of a second one of the stator coils and a second resistor, means connecting a second input of the second comparator to a junction between the second stator coil and said second resistor, and a third resistor included between the junction of the first stator coil and the first resistor and the junction of the second stator coil and the second resistor.

6. An electric machine as claimed in claim 5, characterized in that the third resistor is a variable resistor.

7. An electric machine as claimed in claim 3, 4, 5 or 6 wherein the machine is a three-phase machine having three stator coils and the combining circuit is adapted to supply signals with an electrical phase difference of 60° to a first one and second one of said stator coils and that the third one of said stator coils is connected between the first and second stator coils to form a delta connection thereof.

8. An electric machine as claimed in any one of claims 1 to 6, characterized in that the energizing circuit is at least partly incorporated in an integrated circuit together with the two magneto-sensitive elements.

9. An electric machine as claimed in claims 3 or 4 wherein the combining circuit includes means for supplying a third signal E that satisfies the equation $E = -(C+D)$ and K has a value such that the signals C, D and E have a mutual phase difference $\phi$ of 120°.

10. An electric machine as claimed in claims 3 or 4 wherein the angular spacing between said two magneto-sensitive elements is $\alpha$ and K is a constant factor which depends on the angle $\alpha$ and the phase difference $\phi$.

11. An electric machine as claimed in claim 1 wherein the combining circuit includes first, second and third amplifiers having gain factors of G, G, and $(K-1)G$, respectively, and said two magneto-sensitive elements are each coupled to said first, second and third amplifiers so as to yield three output signals $G(A-KB)$, $G(B-KA)$ and $G(K-1)(A+B)$, respectively, where A and B are the signals supplied by a first and a second one of said magneto-sensitive elements, and K is a constant such as to produce a mutual phase difference $\phi$ of 120° between said three output signals, and means for coupling said three output signals respectively to three stator coils of a three phase electric machine.

* * * * *

UNITED STATES PATENT AND TRADEMARK OFFICE
CERTIFICATE OF CORRECTION

PATENT NO. : 4,354,145
DATED : October 12, 1982
INVENTOR(S) : JOHANNES H.H. JANSSEN It is certified that error appears in the above-identified patent and that said Letters Patent is hereby corrected as shown below:

In the Abstract:

Line 3, after "axis" insert -- which is --

In the Claims:

Claim 5, line 4, change "and" (second occurence) to --an--

Claim 7, line 5, after "and" (first occurence) insert --a--

Signed and Sealed this

Eighteenth Day of June 1985

[SEAL]

Attest:

DONALD J. QUIGG

*Attesting Officer*     *Acting Commissioner of Patents and Trademarks*